United States Patent
Kim et al.

(10) Patent No.: US 9,319,413 B2
(45) Date of Patent: Apr. 19, 2016

(54) METHOD FOR ESTABLISHING RESOURCE ACCESS AUTHORIZATION IN M2M COMMUNICATION

(71) Applicant: MODACOM CO., LTD., Seoul (KR)

(72) Inventors: Kyung-su Kim, Yongin-si (KR); Jaeho Lee, Seoul (KR); Yong-jin Kim, Seoul (KR)

(73) Assignee: MODACOM CO., LTD. (KR)

( * ) Notice: Subject to any disclaimer, the term of this patent is extended or adjusted under 35 U.S.C. 154(b) by 0 days.

(21) Appl. No.: 14/403,977

(22) PCT Filed: Nov. 21, 2012

(86) PCT No.: PCT/KR2012/009879
§ 371 (c)(1),
(2) Date: Nov. 25, 2014

(87) PCT Pub. No.: WO2013/180357
PCT Pub. Date: Dec. 5, 2013

(65) Prior Publication Data
US 2015/0143472 A1 May 21, 2015

(30) Foreign Application Priority Data

May 30, 2012 (KR) ........................ 10-2012-0057167

(51) Int. Cl.
*H04L 9/00* (2006.01)
*H04L 29/06* (2006.01)
(Continued)

(52) U.S. Cl.
CPC .............. *H04L 63/10* (2013.01); *H04W 4/005* (2013.01); *H04W 12/06* (2013.01); *H04W 12/08* (2013.01);
(Continued)

(58) Field of Classification Search
CPC ...................................................... H04L 63/10
USPC .............................................. 726/2, 3, 4, 6, 9
See application file for complete search history.

(56) References Cited

U.S. PATENT DOCUMENTS 6,460,141 B1* 10/2002 Olden .................. G06F 21/604
726/12
7,729,215 B2 6/2010 Suzuki
(Continued)

FOREIGN PATENT DOCUMENTS

KR 10-2010-0011142 2/2010
KR 10-2010-0099625 A 9/2010
(Continued)

OTHER PUBLICATIONS

European Telecommunications Standards Institute, "Machine-To-Machine Communications (M2M); Functional Architecture", ETSI TS 102 690 (Oct. 2011), V1.1.1, pp. 1-180.
(Continued)

*Primary Examiner* — Haresh N Patel
(74) *Attorney, Agent, or Firm* — Harness, Dickey & Pierce, P.L.C.

(57) ABSTRACT

A method for establishing a resource access authorization in M2M communication is provided. When an entity including a terminal, a gateway and an end user as client in a first M2M service provider domain attempts to access resource located in terminal or gateway in second M2M service provider domain, the method includes receiving client credential allocated from M2M Authentication Server (MAS1) in first M2M service provider domain by performing client registration to Network Service Capabilities Layer (NSCL1) in first M2M service provider domain by client, requesting an authorization to access resource to resource owner through NSCL (NSCL2) in second M2M service provider domain based on information about Universal Resource Identifier (URI) of resource by client, verifying client through MAS1 by the resource owner, authorizing client to access the resource by the resource owner, and issuing access token to the client by MAS (MAS2) in second M2M service provider domain.

5 Claims, 10 Drawing Sheets

(51) Int. Cl.
*H04W 48/02* (2009.01)
*H04W 4/00* (2009.01)
*H04W 12/10* (2009.01)
*H04W 12/06* (2009.01)
*H04W 12/08* (2009.01)

(52) U.S. Cl.
CPC .............. *H04W 12/10* (2013.01); *H04W 48/02* (2013.01); *H04L 63/0807* (2013.01); *H04L 63/0892* (2013.01)

(56) References Cited

U.S. PATENT DOCUMENTS

| | | | | |
|---|---|---|---|---|
| 2006/0021004 | A1* | 1/2006 | Moran | H04L 63/08 726/2 |
| 2006/0253420 | A1* | 11/2006 | Hinton | G06F 21/62 707/999.002 |
| 2007/0116250 | A1* | 5/2007 | Stafford | H04L 29/12066 379/355.09 |
| 2008/0025163 | A1 | 1/2008 | Suzuki | |
| 2008/0134305 | A1* | 6/2008 | Hinton | H04L 63/08 726/5 |
| 2008/0279200 | A1* | 11/2008 | Shatzkamer | H04L 63/0892 370/401 |
| 2009/0216854 | A1* | 8/2009 | Ogasawara | H04L 12/2812 709/208 |
| 2010/0031317 | A1* | 2/2010 | Mason | H04L 63/0281 726/3 |
| 2011/0090535 | A1* | 4/2011 | Towata | G06F 3/1203 358/1.15 |
| 2011/0131567 | A1* | 6/2011 | Tirk | G06F 8/60 717/176 |
| 2012/0151028 | A1* | 6/2012 | Lu | H04W 4/18 709/223 |
| 2012/0238247 | A1* | 9/2012 | Wen | H04W 12/08 455/411 |
| 2013/0007858 | A1* | 1/2013 | Shah et al. | H04L 63/0815 726/6 |
| 2013/0139241 | A1* | 5/2013 | Leeder | H04W 12/06 726/9 |
| 2013/0188515 | A1* | 7/2013 | Pinheiro | H04W 4/001 370/254 |
| 2013/0336222 | A1* | 12/2013 | Lu | H04W 72/00 370/328 |
| 2014/0089478 | A1* | 3/2014 | Seed | H04W 4/001 709/222 |
| 2014/0126581 | A1* | 5/2014 | Wang | H04W 4/001 370/431 |
| 2015/0105044 | A1* | 4/2015 | Maguire | H04L 67/16 455/406 |

FOREIGN PATENT DOCUMENTS

| | | |
|---|---|---|
| KR | 10-2010-0113577 A | 10/2010 |
| KR | 10-2011-0117030 A | 10/2011 |

OTHER PUBLICATIONS

International Search Report for PCT/KR2012/009879 (in English and Korean), mailed Mar. 28, 2013; ISA/KR.
International Search Report for PCT/KR2012/009878 (in English and Korean), mailed Mar. 28, 2013; ISA/KR.

* cited by examiner

METHOD FOR ESTABLISHING RESOURCE ACCESS AUTHORIZATION IN M2M COMMUNICATION

TECHNICAL FIELD

The present disclosure in one or more embodiments relates to a method for authorizing access to resource in Machine-to-Machine (M2M) communications. More particularly, the present disclosure relates to a method for, when an entity attempts to access resource located in another entity (Device/Gateway), establishing an authorization of the entity to access to the resource in M2M communications.

BACKGROUND

The statements in this section merely provide background information related to the present disclosure and do not constitute prior art.

In general, M2M communication enables various machines equipped with a wireless communication module to implement various communication services with no or minimal human intervention. With M2M communication, communication services shift from existing human-to-human communication to device-to device communication. The M2M communication technology is extended to solutions to collect information about various devices, process the collected information into useful information, and provide the useful information in a customized manner by combining communication technology with Information Technology (IT), beyond a communication function focusing on simple data transmission between a human being and a device or between devices.

An M2M standard under way represents information data managed by an M2M device or an M2M gateway, and an M2M server as resource data. In an M2M service structure viewed from the perspective of data information processing, an M2M device and an M2M gateway transmit their collected data to an M2M server. A Network Application (NA) of an M2M service provider accesses resource data of the M2M server and searches for information according to a policy of the M2M service provider without any particular access granting procedure from an owner of the resource data. The M2M standardization is now in its initial stage, not specifying a method for establishing an authorization to access resource data. Thus, efforts are expended on development of a method for establishing an authorization to access resource data.

DISCLOSURE

Technical Problem

Therefore, the present disclosure has been made in an effort to effectively provide a method for authorizing access to resource so that an entity may share its resource data with another entity in various Machine-to-Machine (M2M) communication environments.

Summary

In accordance with some embodiments of the present disclosure, a method for establishing an authorization to access resource in Machine-to-Machine (M2M) communication, when an entity selected from a terminal, a gateway and an end user as a client in a first M2M service provider domain attempts to access resource located in a terminal or a gateway in a second M2M service provider domain, comprising receiving by the client a client credential allocated from an M2M Authentication Server (MAS1) in the first M2M service provider domain by performing a client registration to a Network Service Capabilities Layer (NSCL1) in the first M2M service provider domain; requesting by the client an authorization to access the resource to a resource owner of the resource through an NSCL (NSCL2) in the second M2M service provider domain based on information about a Universal Resource Identifier (URI) of the resource; verifying by the resource owner the client through MAS1; granting the authorization for the client to access the resource by the resource owner; and issuing an access token to the client by a MAS (MAS2) in the second M2M service provider domain.

In accordance with another aspect, a method for accessing resource located in a terminal or a gateway in a second Machine-to-Machine (M2M) service provider domain by an entity selected from a terminal, a gateway and an end user as a client in a first M2M service provider domain, comprises receiving a client credential allocated from an M2M Authentication Server (MAS1) in the first M2M service provider domain by performing a client registration to a Network Service Capabilities Layer (NSCL1) in the first M2M service provider domain; requesting an authorization to access the resource to a resource owner of the resource based on information about a Universal Resource Identifier (URI) of the resource; receiving an access token issued from a MAS (MAS2) in the second M2M service provider domain; and accessing the resource based on the issued access token.

In accordance with yet another aspect, a method for establishing an authorization of a client to access resource located in a terminal or a gateway in a first Machine-to-Machine (M2M) service provider domain by a resource owner of the resource, the client being one of a terminal, a gateway, and an end user in a second M2M service provider domain, comprises: receiving an authorization request for the client; verifying the client through an M2M Authentication Server (MAS2) in the second M2M service provider domain; and authorizing the client to an entity in which the resource is located and an M2M Authentication Server (MAS1) in the first M2M service provider domain.

In accordance with yet another aspect, a method for establishing an authorization to access resource, when an entity as a client belonging to no Machine-to-Machine (M2M) service provider domain attempts to resource located in a terminal or a gateway in an M2M service provider domain, comprises: receiving by the client a client credential allocated from an M2M Authentication Server (MAS) in the M2M service provider domain by performing a client registration to a Network Service Capabilities Layer (NSCL) in the M2M service provider domain; requesting by the client an authorization to access the resource to a resource owner of the resource through the NSCL in the M2M service provider domain based on information about a Universal Resource Identifier (URI) of the resource; verifying by the resource owner the client through the MAS in the M2M service provider domain; authorizing by the resource owner the client to access the resource; and issuing an access token to the client by the MAS.

In accordance with yet another aspect, a method for accessing resource located in a terminal or a gateway in an M2M service provider domain by an entity as a client belonging to no Machine-to-Machine (M2M) service provider domain, comprises: receiving a client credential allocated from an M2M Authentication Server (MAS) in the M2M service provider domain by performing a client registration to a Network Service Capabilities Layer (NSCL) in the M2M service provider domain; requesting an authorization to access the resource to a resource owner of the resource based on information about a Universal Resource Identifier (URI) of the resource; receiving an access token issued from the MAS; and accessing the resource based on the issued access token.

In accordance with yet another aspect, a method for establishing an authorization of an entity as a client to access resource located in a terminal or a gateway in a Machine-to-Machine (M2M) service provider domain by a resource owner of the resource, the client belonging to no M2M service provider domain, comprises: receiving an authorization request for the client; verifying the client through an M2M Authentication Server (MAS) in the M2M service provider domain; and authorizing the client to access the resource to an entity in which the resource is located and the MAS.

In accordance with yet another aspect, a method for establishing an authorization to access resource in Machine-to-Machine (M2M) communication, when an entity selected from a terminal, a gateway and an end user as a client in an M2M service provider domain attempts to access resource located in a terminal or a gateway in the same M2M service provider domain, comprises: receiving by the client a client credential allocated from an M2M Authentication Server (MAS) in the M2M service provider domain by performing a client registration to a Network Service Capabilities Layer (NSCL) in the M2M service provider domain; requesting an authorization to access the resource to a resource owner of the resource through the NSCL in the M2M service provider domain based on information about a Universal Resource Identifier (URI) of the resource by the client; verifying by the resource owner the client through the MAS in the M2M service provider domain; granting the authorization for the client to access the resource by the resource owner; and issuing an access token to the client by the MAS in the M2M service provider domain.

In accordance with yet another aspect, a method for accessing resource located in a terminal or a gateway in a Machine-to-Machine (M2M) service provider domain by an entity selected from a terminal, a gateway and an end user as a client in the same M2M service provider domain, comprises: receiving a client credential allocated from an M2M Authentication Server (MAS) in the M2M service provider domain by performing a client registration to a Network Service Capabilities Layer (NSCL) in the M2M service provider domain; requesting an authorization to access the resource to a resource owner of the resource based on information about a Universal Resource Identifier (URI) of the resource; receiving an access token issued from the MAS in the M2M service provider domain; and accessing the resource based on the issued access token.

In accordance with yet another aspect, a method for establishing an authorization of a client to access resource located in a terminal or a gateway in a Machine-to-Machine (M2M) service provider domain by a resource owner of the resource, the client being one of a terminal, a gateway, and an end user in the M2M service provider domain, comprises: receiving an authorization request for the client; verifying the client through an M2M Authentication Server (MAS) in the M2M service provider domain; and authorizing the client to an entity in which the resource is located and the MAS.

In accordance with yet another aspect, a method for authorizing access of a client to resource by a terminal or gateway having the resource in a Device Service Capabilities Layer (DSCL) or a Gateway Service Capabilities Layer (SSCL) in Machine-to-Machine (M2M) communication, comprises: receiving an authorization request for the client from a resource owner of the resource; establishing an authorization of the client to access the resource; receiving an access token issued to the client from a server providing an Authentication, Authorization, and Accounting (AAA) service; and determining whether to authorize the client to access the resource according to whether the access token received from the server providing the AAA service is identical to an access token provided by the client.

Advantageous Effects

According to the present disclosure as described above, since an entity attempting to access resource located in a domain of an M2M service provider gets an access token issued from an M2M Authentication Server (MAS) as an authentication key for temporary access to the resource and uses the access token, information can be shared between a plurality of entities, access of an unauthorized entity to information of another entity can be prevented, and a security threat that may occur to resource data shared between entities can be prevented.

DETAILED DESCRIPTION

Figure 1:
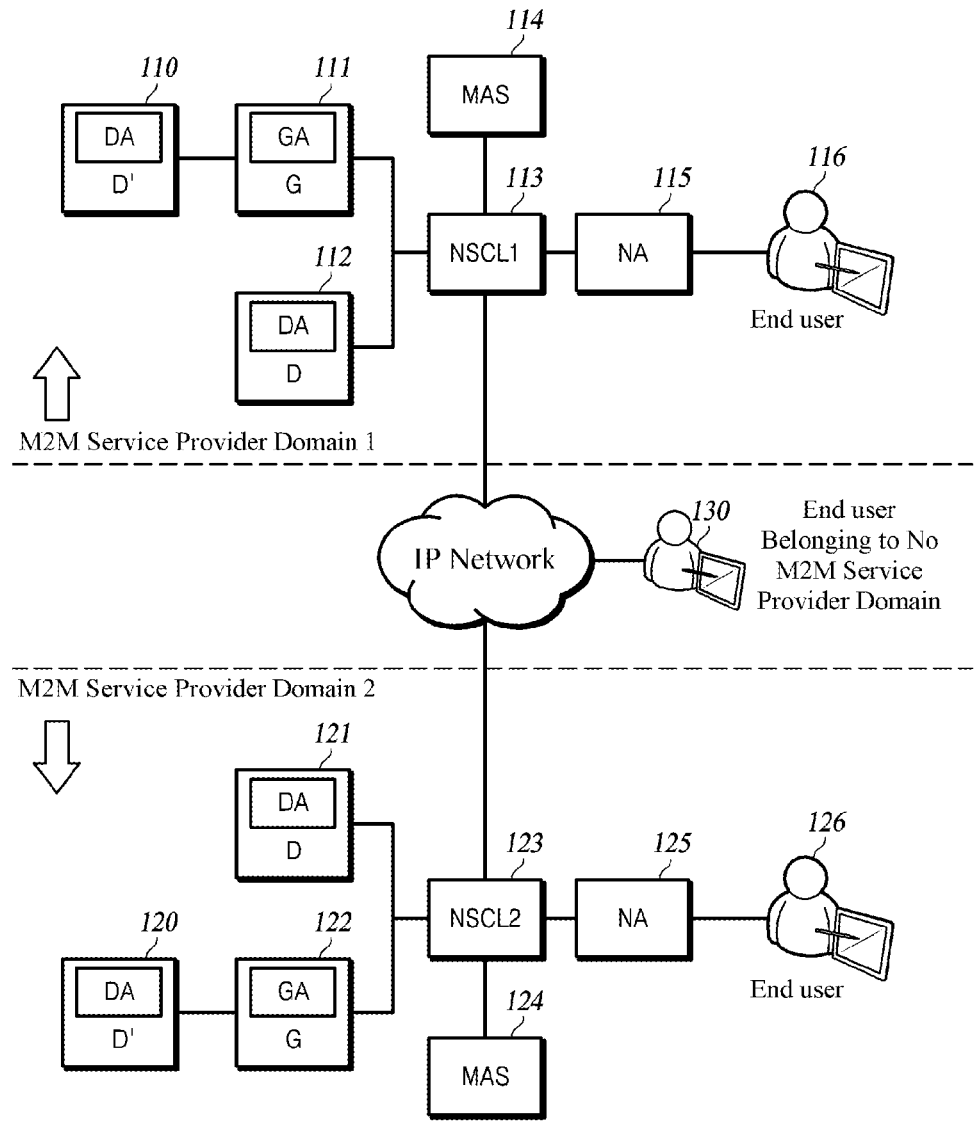
FIG. 1 is a schematic block diagram showing a relationship between Machine-to-Machine (M2M) service entities.

Hereinafter, a method for establishing an authorization to access resource in Machine-to-Machine (M2M) communication according to at least one embodiment of the present disclosure will be described in detail. The drawings will leave out untold particulars for the purpose of clarity and for brevity. In the following description, like reference numerals designate like elements, although the elements are shown in different drawings.

In addition, one of ordinary skill would understand terms like 'include', 'comprise', and 'have' to be interpreted in default as inclusive or open rather than exclusive or closed unless expressly defined to the contrary. All the terms that are technical, scientific or otherwise agree with the meanings as understood by a person skilled in the art unless defined to the contrary. One of ordinary skill would understand common terms as found in dictionaries are interpreted in the context of the related technical writings not too ideally or impractically unless the present disclosure expressly defines them so. A term used hereinbelow, 'resource owner' refers to an entity that may grant or reject an authorization to access resource to a client attempting to access the resource. The resource owner may be an M2M device, an M2M gateway, or an M2M application. A term 'client' refers to an entity attempting to access resource carrying information collected or generated by another M2M device, another M2M gateway, or another M2M application. The client may be an M2M device, an M2M gateway, or an M2M application that is located in an M2M service provider domain, or an end user or a third-party application that does not belong to any M2M service provider domain. A term 'resource' refers to a bucket containing information collected or generated by an M2M application. The resource is accessed using a Universal Resource Identifier (URI), Resource_URI. A term 'D/G' refers to an M2M Device (D) and an M2M Gateway (G). Unless otherwise specified, terms or abbreviations described in the specification should be interpreted in conformance to M2M technical specifications of the M2M communication field and the European Telecommunications Standards Institute (ETSI). For example, NSCL represents an M2M Service Capability Layer in a network domain. In addition, an M2M application is an application that executes a service logic and uses service capabilities accessible through an open interface. M2M applications include Network Application (NA), Gateway Application (GA), and Device Application (DA). An NA refers to an application that executes a service logic and is located in a network and application program domain, using service capabilities accessible through an open interface. A GA refers to an application that executes a service logic and is located in an M2M gateway, using service capabilities accessible through an open interface. A DA refers to an application that executes a service logic and is located in an M2M device, using service capabilities accessible through an open interface. While an M2M Authentication Server (MAS) defined in an ETSI M2M standard is described throughout the specification as a server that verifies a client, generates an authorization code, and issues an access token, a general Authentication, Authorization, and Accounting (AAA) server or a server providing an AAA service in a third M2M service provider domain may serve as the MAS.

With reference to the attached drawings, a method for establishing an authorization to access resource in M2M communication according to the present disclosure will be described in detail.

FIG. 1 is a diagram schematically showing a relationship between M2M service entities.

FIG. 1 is based on the assumption that there are various M2M service providers providing different services in M2M communication. Referring to FIG. 1, there are NAs 115 and 125, first and second NSCLs (NSCL1 and NSCL2) 113 and 123, MASs 114 and 124, and M2M gateways 111 and 122 each including a GA, M2M devices 110, 112, 120, and 121 each including a DA, and end-user devices 116 and 126 in first and second M2M service provider domains (M2M service provider domain 1 and M2M service provider domain 2). Some M2M devices 112 and 121 may access a network domain directly and other M2M devices 110 and 120 may access the network domain through one or more gateways serving as proxies of the network domain. An end-user device 130 may access an M2M service provider domain through the Internet from the outside, without subscribing to any M2M service provider. While each M2M service provider domain is shown in FIG. 1 as including a MAS, a plurality of M2M service provider domains may share a single MAS in an embodiment.

While resource may be located in Service Capabilities Layers (SCLs) of the M2M devices 110, 112, 120, and 1212 and the M2M gateways 111 and 122 as well as the NSCLs 113 and 123, the following description is given of a method for establishing an authorization to access resource according to an embodiment of the present disclosure, with the appreciation that resource is located in the SCL of a D/G. A resource owner may be any of a device, a gateway, and an NA and a client may be any of a device, a gateway, an NA, and an end user.

To implement a method for acquiring an authorization to access protected resource data in an M2M service provider domain by a client, the three cases may be considered depending on whether the client and a resource owner belong to the same or different M2M service provider domains. One of the three cases is that the resource owner and the client belong to different M2M service provider domains. Such an example is convergence between vertical service domains that provide specialized services of specific business types. For example, an optimized environment may be built for a patient by exchanging information between an e_Health terminal and a home network or between home energy devices. In this case, direct communication between devices is more efficient than information exchange between the devices through a server. For direct communication, there may be a need for an operation for preliminarily establishing an authorization to access data of the other device between devices included in each M2M service provider domain. Another case is that the client is located outside an M2M service provider domain. For example, when a portable phone attempts to search for weather information such as an ambient weather and temperature of an office by direct communication with a weather measurer related to a weather information service or when a portable phone attempts to search for Global Positioning System (GPS) data by direct communication with a Digital Tachograph (DTG) of a bus, an operation for acquiring an authorization to search for the data may be needed. The other case is that the client and the resource owner belong to the same M2M service provider domain. For example, when data communication is conducted between vehicles by Car_to_Car communication or state information data of patients are exchanged between e_Health terminals, even access of a device subscribing to the same M2M service to data of another device may cause a problem and thus an operation for acquiring an authorization to access data may be needed.

Figure 2:
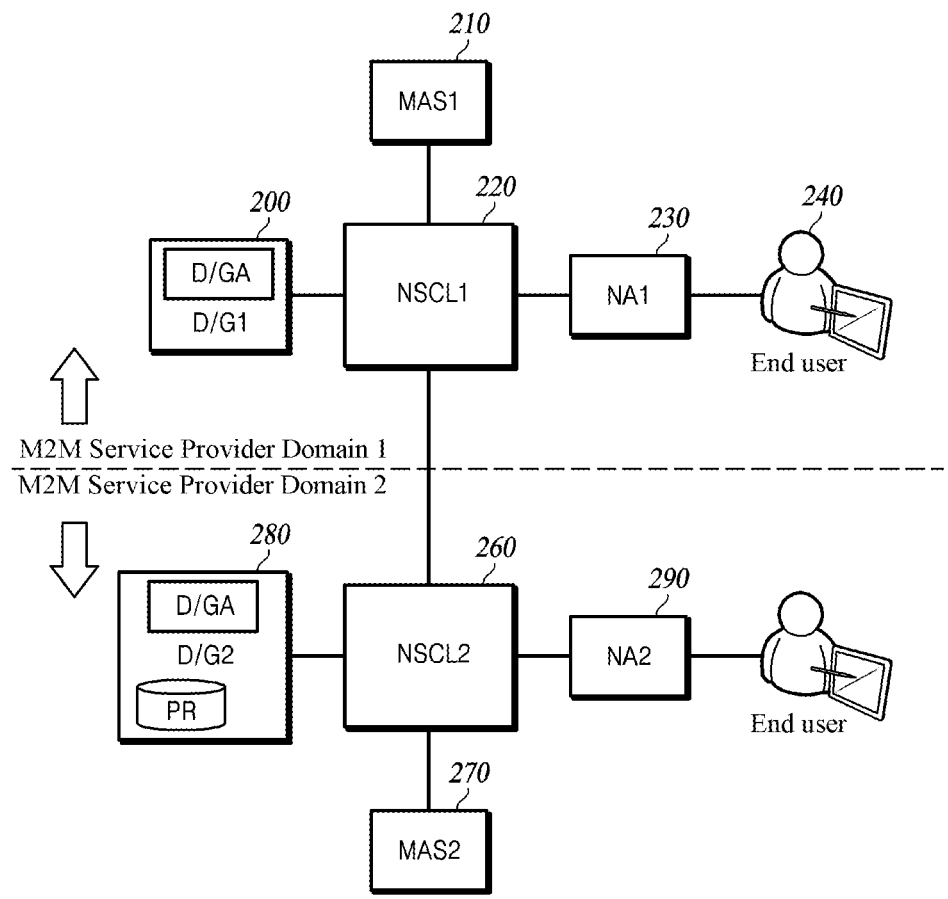
FIG. 2 is a schematic block diagram showing a relationship between M2M devices, when a client and a resource owner are located in different M2M service provider domains.
Figure 3:
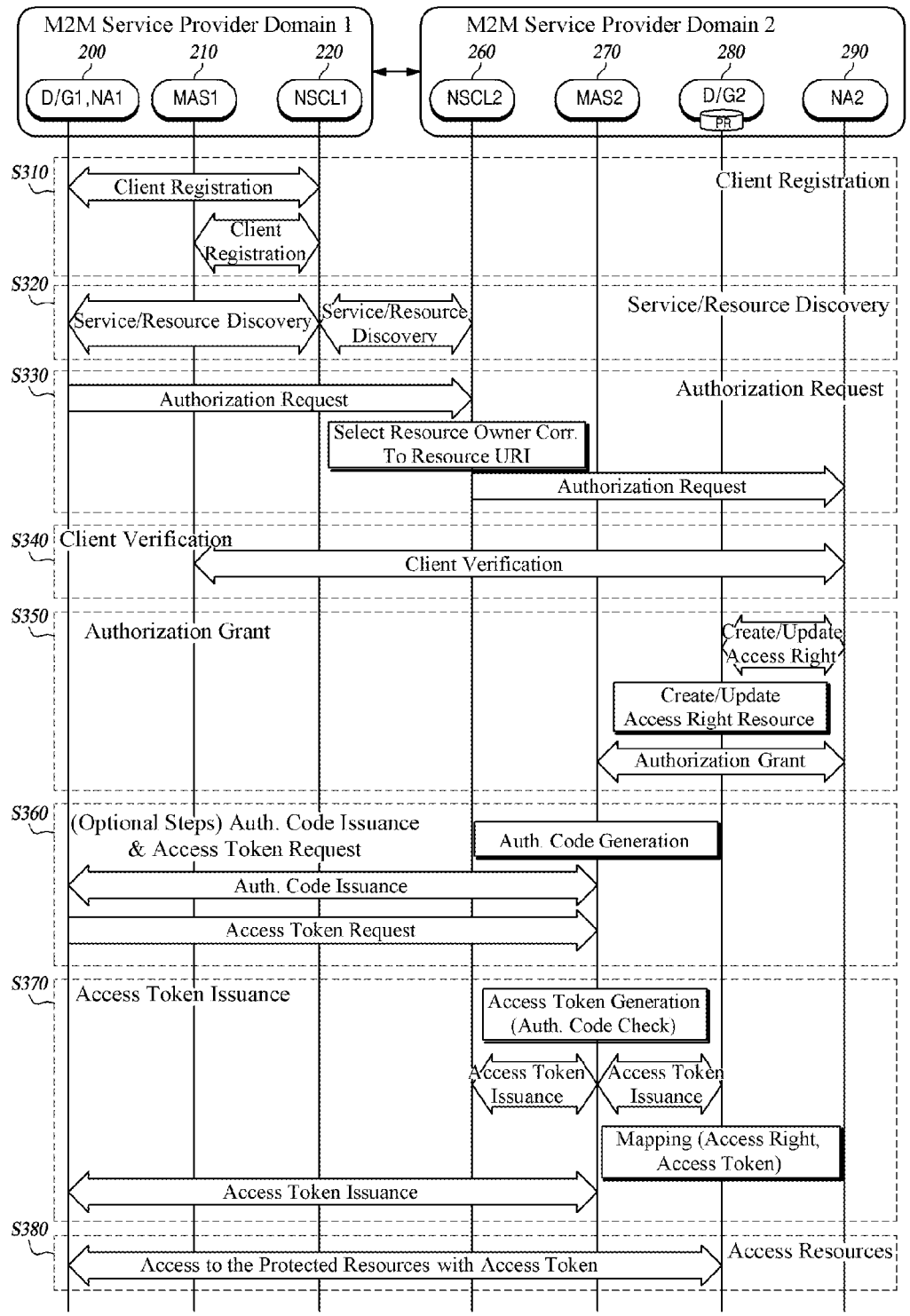
FIG. 3 is a flowchart of an operation for establishing an authorization to access resource, when a client and a resource owner are located in different M2M service provider domains and the resource owner is a second Network Application (NA2) according to an embodiment of the present disclosure.

With reference to FIGS. 2 and 3, a method for authorizing resource access according to an embodiment of the present disclosure in the case where a client and a resource owner belong to different M2M service provider domains will be described below.

FIG. 2 is a schematic block diagram showing a relationship between M2M service entities, when a client and a resource owner are located in different M2M service provider domains.

FIG. 2 is based on the assumption that a first D/G (D/G1) 200, a first NA (NA1) 230, or an end user 240 belonging to M2M service provider domain 1 attempts to access resource located in a second D/G (D/G2) 280 belonging to M2M service provider domain 2.

An entity responsible for determining whether to grant or reject access of D/G1 200 to the resource located in D/G2 280 and determining an access scope for D/G1 200 may be D/G2 280 that has generated or collected information carried in the resource, or a second NA (NA2) 290 of a relevant M2M server. Accordingly, a client is D/G1 200, NA1 230, or the end user 240 in M2M service provider domain 1, and a resource owner is NA2 290 in M2M service provider domain 2.

While MASs 210 and 270 are shown in FIG. 2 as separately configured in different M2M service provider domains as described before, a server providing an AAA service in a third M2M service provider domain may substitute for the MASs 210 and 270, in terms of functionality.

FIG. 3 is a flowchart of an operation for establishing an authorization to access resource, when a client and a resource owner are located in different M2M service provider domains and the resource owner is NA2 according to an embodiment of the present disclosure.

While a mechanism of establishing an authorization to access resource according to an embodiment of the present disclosure is illustrated in FIG. 3 in the case where a client is D/G1, it should be understood that the same mechanism is applicable when the client is NA1 230 or the end user 240.

STEP 00 is pre-procedures conforming to the ETSI M2M standard. In the pre-procedures, the client completes an M2M service bootstrap procedure, an M2M service connection procedure, and an SCL registration procedure. In addition, a relationship between D/G1 200 and a D/GSCL may be based on the premise that D/G1 200 performs a procedure for registering a DA and a first GA (GA1).

STEP 01 is a client registration step S310. D/G1 200 is allocated client credentials (Client_ID and Client_Secret) by performing a client registration procedure on NSCL1 220. Specifically, upon receipt of a client registration message from D/G1 200, NSCL1 220 transmits a client registration message to MAS1 210. Upon receipt of the client registration message from NSCL1 220, MAS1 210 generates Client_ID and Client_Secret for D/G1 200 and allocates Client_ID and Client_Secret to D/G1 200 through NSCL1 220. Although Client_ID and Client_Secret are not limited to any specific generation method, MAS1 210 may allocate, as Client_ID, one of Identifiers (IDs) defined in the ETSI M2M standard, such as App_ID, Node_ID, Service Connection_ID, and SCL_ID of a client, or a value generated by combining the one ID with one or more of an application Key, a root Key, and a connection key. Client_Secret may be generated in various manners using at least one of the IDs and the keys.

STEP 02 is a service/resource discovery step S320. For the client to initiate an authorization procedure, a procedure for providing a service requested by the client or discovering a resource owner having resource information is needed. The client acquires information (ID or URI) about the resource owner and determines the location of a resource server (D/GSCL) in which the resource is located by the service/ resource discovery step. For this purpose, in one embodiment, the client acquires information about the location (ID or URI) of the resource owner and the location of the resource server (D/GSCL) resource through NSCL2 260 belong to the M2M service domain where the resource is located. For example, the service/resource discovery step S320 may include transmitting a discovery message including discovery filter criteria such as the type of desired information to NSCL1 220 by D/G1 200, transmitting the discovery message to NCSL2 260 having discovery resource by NCSL1 220, and searching for a Resource_URI list matching the discovery filter criterion and transmitting a search result to D/G1 200 by NSCL2 260. In the service/resource discovery step S320, D/G2 280 or the NA2 290, which is the resource owner, may indicate at least one of its URI and Resource_URI to D/G1 200 which is the client. If the client has prior knowledge of the resource owner or the Resource_URI or the locations of the resource owner and the resource are preset, the above service/resource discovery step S320 may be omitted. In other words, the client may acquire the Resource_URI information before an authorization request step S330. The Resource_URI information may be acquired in the service/ resource discovery step S320 or received in advance from the resource owner according to a service provider's setting or policy or in any other procedure.

STEP 03 is the authorization request step S330. In the authorization request step S330, the client requests an authorization to the resource owner. D/G1 200 transmits an authorization request message to NSCL2 260 through NSCL1 220. The authorization request message may include at least one of parameters such as authorization_type, resource_uri, client_id, client_secret, access_scope, callback_uri, and state. Authorization_type indicates an authorization type, client_id and client_secret are client credentials, resource_uri provides information about the location of resource, and state indicates a random value transmitted or received by a client or an authorization server in an authorization step. Access_scope specifies a requested access scope. In other words, access_scope indicates an authorization scope such as Create/Retrieve/Update/Delete or information requiring an access authorization. NCSL2 260 determines a resource owner corresponding to the Resource_URI at an SCL or application resource level. A container resource indicating a container for an instance object and a location container including information about the location of a remote object may include information about the URI of a resource owner, as an attribute. In this case, NSCL2 260 may acquire, from the attribute of the container resource or the location container resource, information about a resource owner having protected resource which the client attempts to access. NSCL2 260 transmits an authorization request message to NA2 290 being a detected resource owner.

STEP 04 is a client verification step S340. The resource owner verifies the client in regard to the authorization request message. To verify the client, the resource owner may request client verification to MAS1 210, an end user connected to the resource owner may verify the client, or the resource owner may request client verification to an M2M service provider (NSCL2/NA2 260/290) and the M2M service provider may verify the client according to an access authorization policy of the M2M service provider. For example, the method for requesting client verification to MAS1 210 may include requesting verification of the client to MAS1 210 to which D/G1 200 has been registered by NA2 290, determining whether D/G1 200 has been normally registered to MAS1 210 based on client credentials by MAS1 210, and transmitting a client verification response message to the resource owner based on the determination result by MAS1 210. The verification request message may include parameters such as the client credentials (Client_ID and Client_Secret) and the client verification response message may include the client credentials and certificates.

STEP 05 is an authorization grant step S350. Upon successful completion of the client authentication, the resource owner NA2 290 requests the resource server D/G2 280 to set up access right for the client D/G1 200 resource through NSCL2 260 so that the client D/G1 can access to the protected resource. The request message includes at least one of parameters including client_id, client_secret, access_scope, and resource_location. Client_id and client_secret are parameters related to client credentials, access_scope is a parameter related to an access scope which the resource owner wishes to allow to the client, and resource_location is a parameter indicating a location at which resource is stored. For example, the resource_location parameter may include Resource_URI information. D/G2 280 generates an access right resource associated with the protected resource in response to the request of NA2 290. Alternatively, if the access right resource associated with the protected resource already exists, D/G2 280 updates the attribute of the access right resource. The access right resource is a resource in which information used to control access to the protected resource is stored, that is, information indicating an entity allowed to access the protected resource and what the allowed entity is allowed to do with the protected resource. NA2 290 transmits an authorization grant message to authorization server MAS2 270 through NSCL2 260 to inform the MAS2 270 that authorization for D/G1 200 has been granted. The authorization grant message may include Client_ID and information about the location of the resource (for example, information indicating whether the resource is stored in the NSCL or D/G2).

STEP 06 is an authorization code issuance and access token request step S360, which is an optional step. MAS2 270 generates an authorization code and issues the authorization code to D/G1 200 through NSCL1 220 and NSCL2 260, as evidence that the authorization request of D/G1 200 has been granted. D/G1 200 requests to issue an access token required to access to information contained in the protected resource to MAS2 270 through NSCL1 220 and NSCL2 260, with presenting the authorization code. The access token issue request message may include at least one of parameters including authorization_type, code, callback_uri, client_id, and client_secret. Authorization_type indicates an authorization type, code indicates an authorization code, callback_uri indicates the ID or URI of the client requesting authorization, and client_id and client_secret provide client credential information.

STEP 07 is an access token issuance step S370. MAS2 270 validates the authorization code presented by D/G2 280. If the authorization code is valid, MAS2 270 generates an access token, delivers the access token to D/G2 280 in which the resource is located so as to associate the access right resource with the access token, and issues the access token to D/G1 200, along with an allowed access scope. MAS2 270 may also transmit the generated access token to NSCL2 260. NSCL2 260 may use the received access token to determine whether D/G1 200 is a rightful client of which a access request message is to be transmitted, when D/G1 200 attempts to access resource located in D/G2 280. In an embodiment, NSCL2 260 may transmit the received access token along with the allowed access scope to D/G1 200, on behalf of MAS2 270. If STEP 06 is omitted, MAS2 270 generates the access token upon receiving the access authorization message from the resource owner in STEP 05, without checking the authorization code. D/G2 280 manages the received access token by mapping the access token to the access right resource. MAS2 270 may issue a refresh token along with the access token in order to update the access token. A message including the issued access token may include one or more of parameters including token_type, expiration_time, access_scope, state, client_id, client_secret, and resource_location. Token_type is a parameter indicating how the token value has been generated, for example, a coding scheme in which the token value has been generated. Expiration_time is a parameter indicating an expiration time of access_token, access_scope is a parameter indicating an allowed access right scope such as Create/Retrieve/Update/Delete or the scope of individual resource that are accessible. State is a parameter indicating a random value used in message exchange between a client and an authorization server and client_id and client_secret are parameters providing client credential information. Resource_location is a parameter indicating whether the resource is stored in an NSCL or a resource owner (ex. DA).

STEP 08 is an access to protected resource step S380. D/G1 200 presents the access token to D/G2 280 in order to access to the protected resource located in D/G2 280. D/G2 280 validates the access token received from D/G1 200 by comparing with the access token received from MAS2 270, checks the access right resource, and allows D/G1 200 to access to the protected resource within the authorization scope matching the access token.

Figure 4:
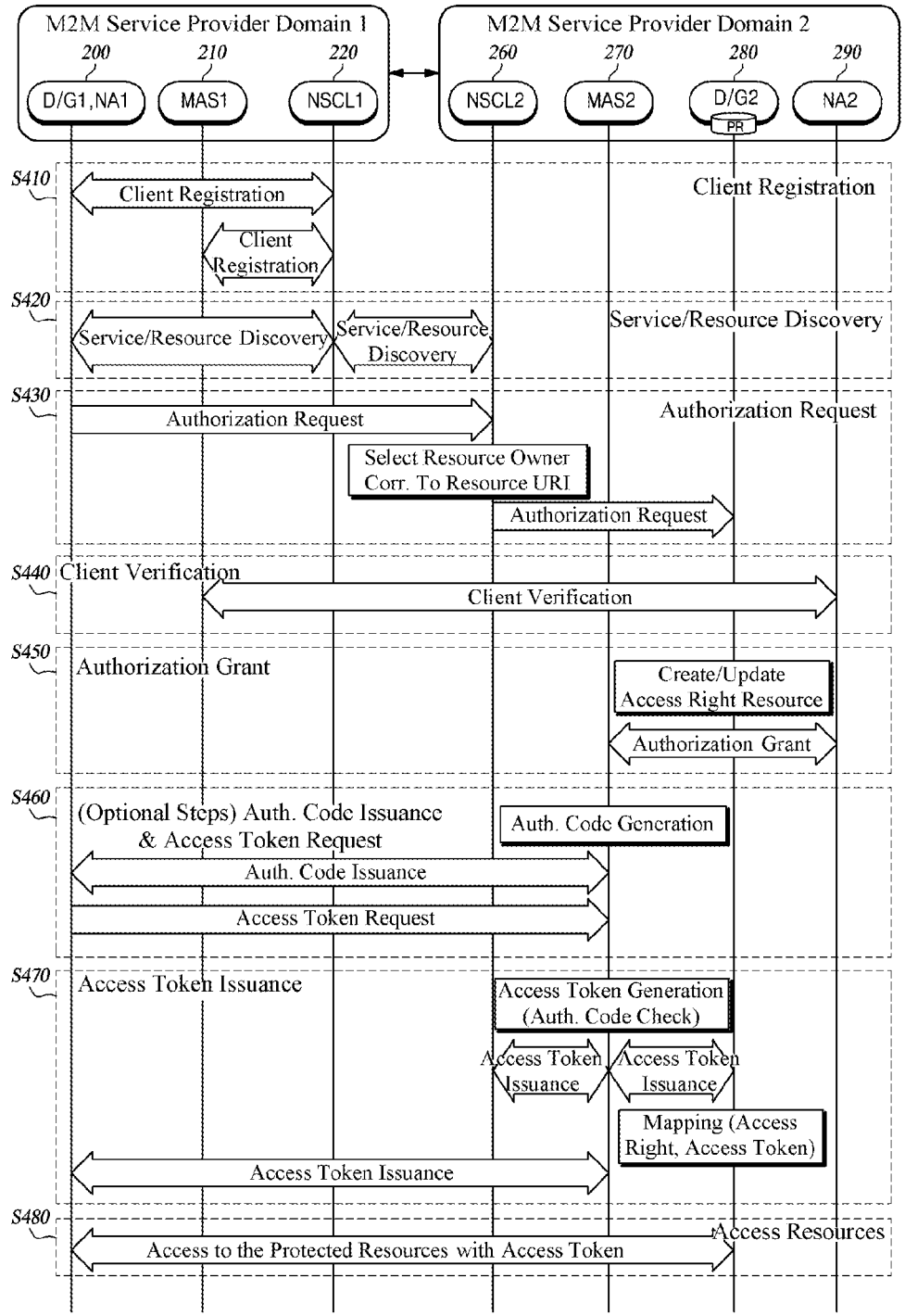
FIG. 4 is a flowchart of an operation for establishing an authorization to access resource, when a client and a resource owner are located in different M2M service provider domains and the resource owner is a second Device/Gateway (D/G2) according to an embodiment of the present disclosure.

FIG. 4 is a flowchart of an operation for establishing an authorization to access resource, when a client and a resource owner are located in different M2M service provider domains and the resource owner is D/G2 according to an embodiment of the present disclosure.

While a mechanism of establishing an authorization to access resource according to an embodiment of the present disclosure is illustrated in FIG. 4 in the case where a client is D/G1, it should be understood that the same mechanism is applicable when the client is the NA 230 or the end user 240.

STEP 01 (S410), STEP 02 (S420), STEP 06 (S460), STEP 07 (S470), and STEP 08 (S480) are performed in the same manner as their counterparts in FIG. 3. Accordingly, a description of the above steps is not provided herein and the following description focuses on STEP 03, STEP 04, and STEP 05.

STEP 03 is an authorization request step S430. In the authorization request step S430, the client requests an authorization to the resource owner. D/G1 200 transmits an authorization request message to NSCL2 260 through NSCL1 220. NCSL2 260 detects a resource owner corresponding to Resource_URI at an SCL or application resource level. As described before with reference to FIG. 3, NSCL2 260 may acquire, from an attribute of a container resource or a location container resource, information about a resource owner having protected resource which the client attempts to access. NSCL2 260 transmits an authorization request message to D/G2 280 being a detected resource owner. Parameters that may be included in the authorization request message have been described in STEP 03 of FIG. 3 and thus will not be described herein.

STEP 04 is a client verification step S440. The resource owner verifies the client in regard to the authorization request message. To verify the client, the resource owner may request client verification to MAS1 210, an end user connected to the resource owner may verify the client, or the resource owner may request client verification to an M2M service provider (NSCL2/NA2 260/290) and the M2M service provider may verify the client according to an access authorization policy of the M2M service provider. For example, the method for requesting client verification to MAS1 210 may include requesting verification of the client to MAS1 210 to which D/G1 200 has been registered through NSCL2 260 and the NSCL1 220 by D/G2 280, performing the verification by MAS1 210 determining whether D/G1 200 has been rightfully registered to MAS1 210 based on client credentials, and transmitting by MAS1 210 a client verification response message to the resource owner based on the determination result through NSCL1 220 and NSCL2 260. The verification request message may include parameters such as the client credentials (Client_ID and Client_Secret), and the client verification response message may include the client credentials and certificates.

STEP 05 is an authorization grant step S450. Upon successful completion of the client authentication, D/G2 280 generates an access right resource associated with the protected resource so that D/G1 200 may access to the protected resource. Alternatively, if the access right resource associated with the protected resource already exists, D/G2 280 updates the attribute of the access right resource. The access right resource is a resource in which information used to control access to the protected resource is stored, that is, information indicating an allowed entity and what the allowed entity is allowed to do with the protected resource. D/G2 280 transmits an authorization grant message to MAS2 270 through NSCL2 260 to inform the MAS2 270 that authorization for D/G1 200 has been granted. The authorization grant message may include Client_ID and information about the location of the resource (for example, information indicating whether the resource is stored in an NSCL or a D/G as a resource owner).

Figure 5:
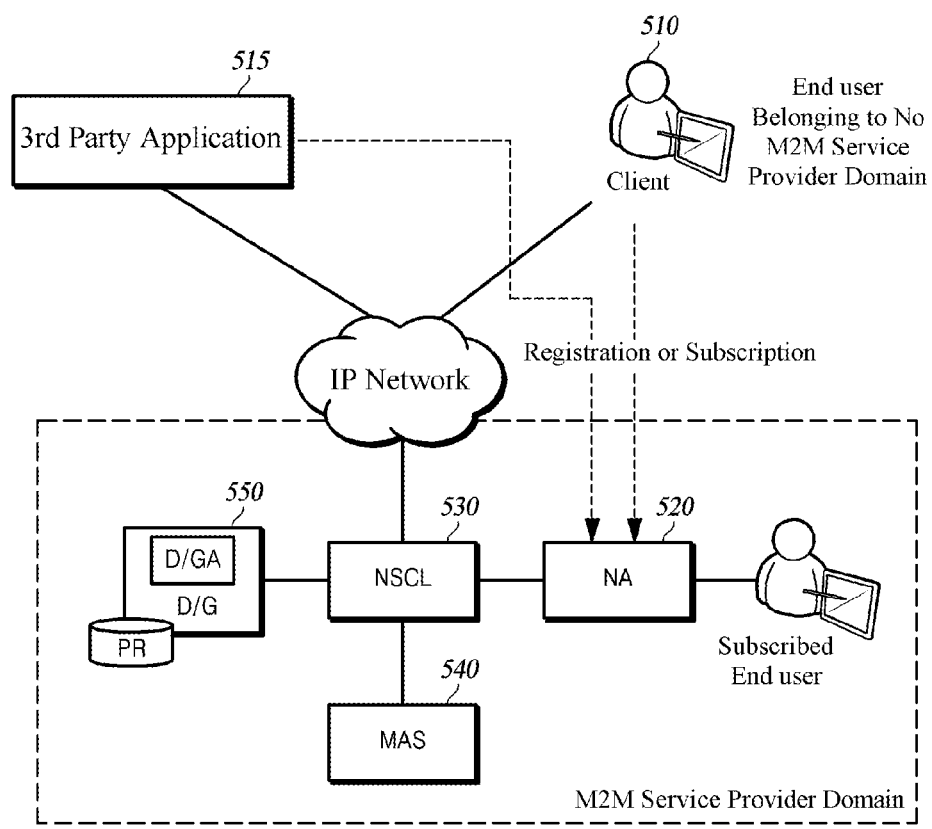
FIG. 5 is a schematic block diagram showing a relationship between M2M service entities, when a client has not subscribed to an M2M service.
Figure 6:
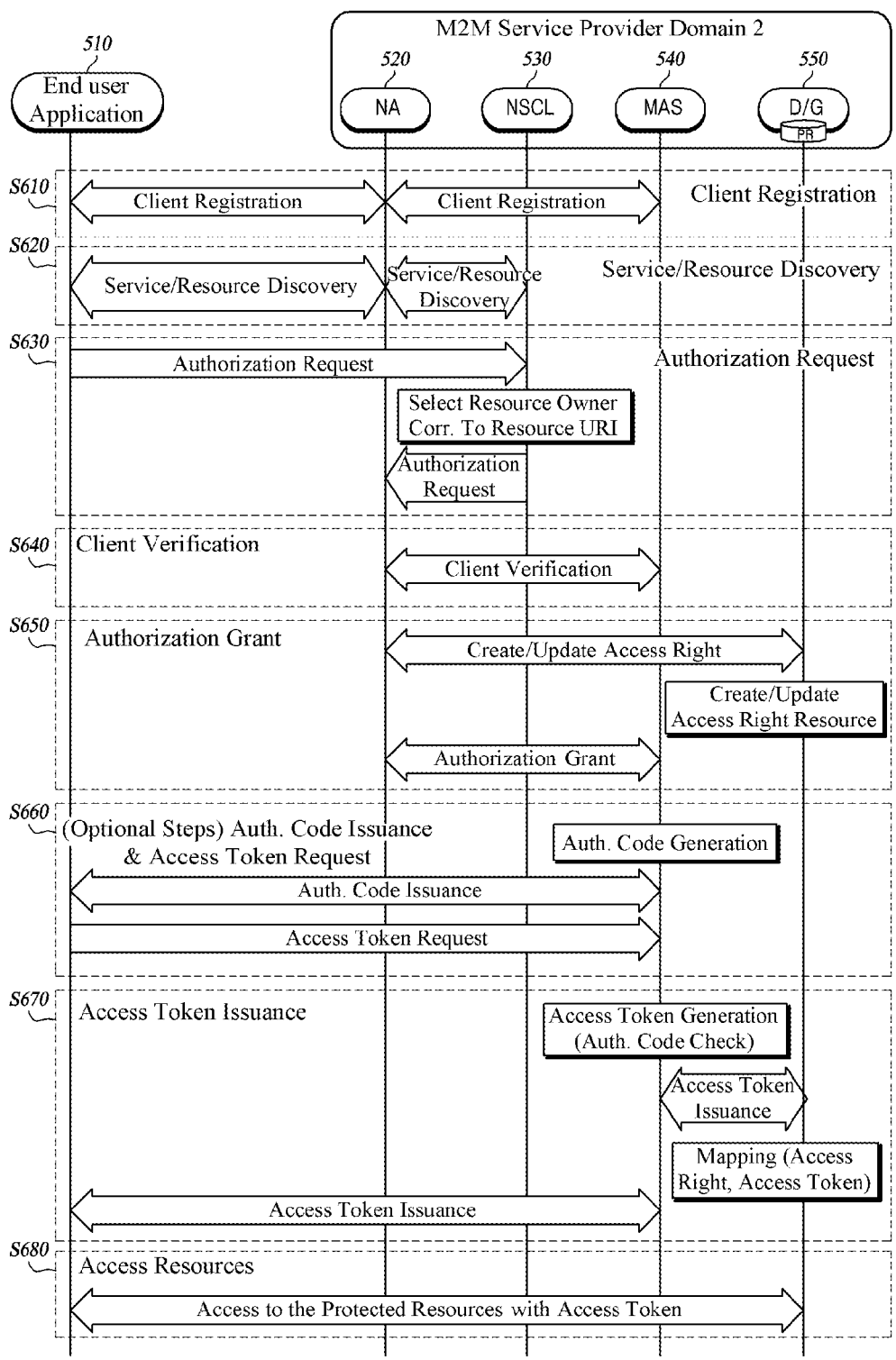
FIG. 6 is a flowchart of an operation for establishing an authorization to access resource, when a client has not subscribed to an M2M service and a resource owner is an NA according to an embodiment of the present disclosure.
Figure 7:
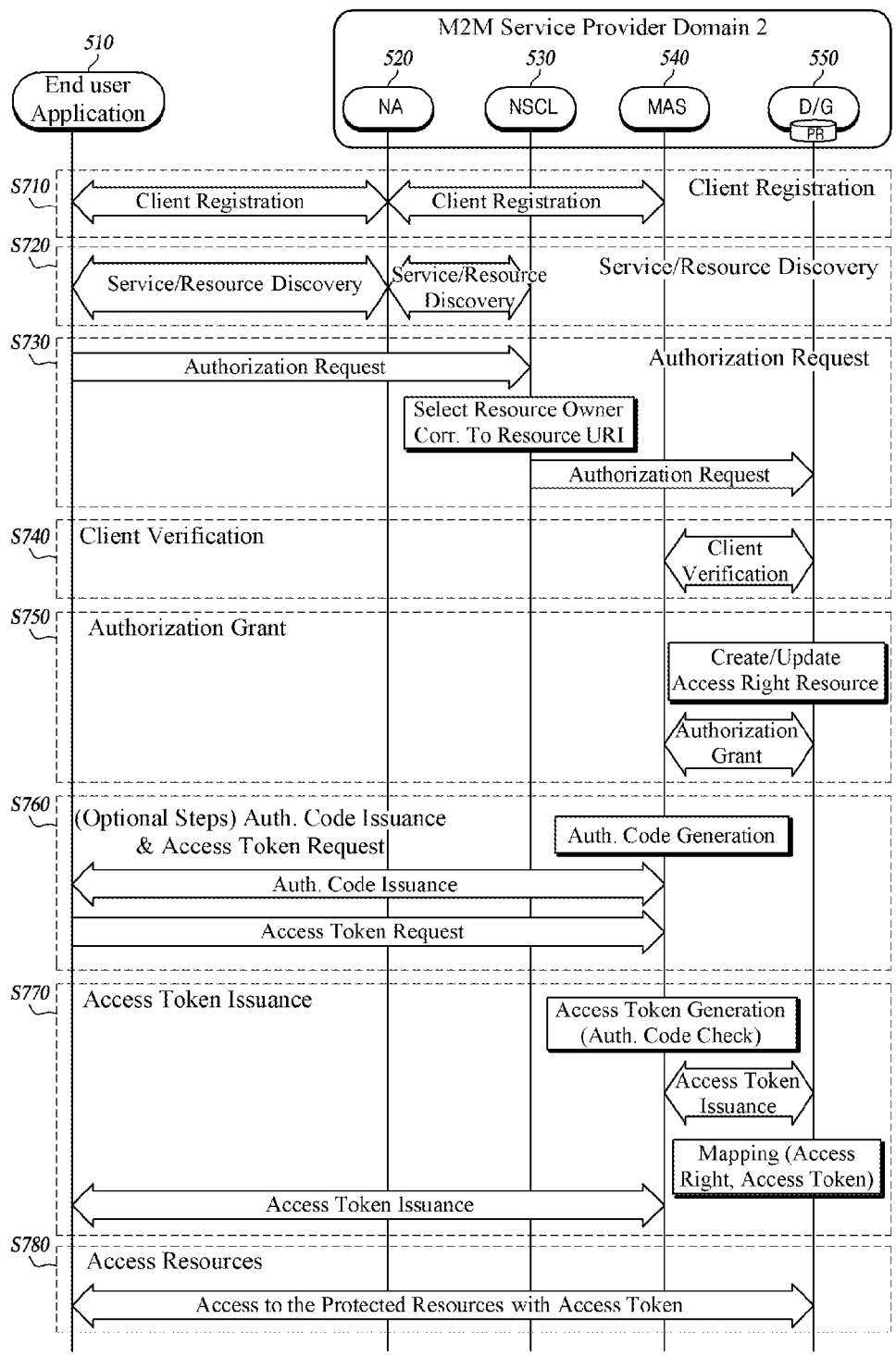
FIG. 7 is a flowchart of an operation for establishing an authorization to access resource, when a client has not subscribed to an M2M service and a resource owner is a first D/G (D/G1) according to an embodiment of the present disclosure.

With reference to FIGS. 5, 6 and 7, a method for authorizing access to resource located in an M2M service provider domain when a client has not subscribed to an M2M service will be described below.

FIG. 5 is a schematic block diagram showing a relationship between M2M service entities, when a client has not subscribed to an M2M service.

FIG. 5 is based on the assumption that an end user 510 belonging to no M2M service provider domain or a third-party application 515 attempts to access resource located in an SCL of a D/G 550 in an M2M service provider domain.

In this case, the end user 510 and the third-party application 515 are clients. After the end user 510 or the third-party application 515 registers or subscribes to an NA 520, the end user 510 or the third-party application 515 needs to be configured so as to acquire an authorization to selectively access only necessary resource during the M2M service.

While a mechanism of establishing an authorization to access resource in the case where a client is an application of the end user 510 according to an embodiment of the present disclosure is illustrated in FIGS. 6 and 7, it should be understood that the same mechanism is applicable when the client is the third-party application 515.

FIG. 6 is a flowchart of an operation for establishing an authorization to access resource, when a client has not subscribed to an M2M service and a resource owner is an NA according to an embodiment of the present disclosure.

In regard to a relationship between entities, as the End-User Application (EUA) 510 has not subscribed to an M2M service provider domain, the EUA 510 is independent of the M2M service provider domain. The EUA 510 is a client and the NA 520 is a resource owner. The D/G 550 is not particularly involved in the operation for establishing an authorization to access resource.

Step 00 is pre-procedures conforming to the ETSI M2M standard. In the pre-procedures, the client completes an M2M service bootstrap procedure, an M2M service connection procedure, and an SCL registration procedure.

STEP 01 is a client registration step S610. The EUA 510 is allocated client credentials (Client_ID and Client_Secret) by performing a client registration procedure. STEP 01 of FIG. 6 is different from STEP 01 of FIG. 3 in that the EUA 510 outside the M2M service provider domain performs the client registration procedure using the NA 520 as a contact point, instead of an NSCL 530. Upon receipt of a client registration message from the EUA 510, the NA 520 transmits a client registration message to a MAS 540. Upon receipt of the client registration message, the MAS 540 generates Client_ID and Client_Secret for the EUA 510 and allocates Client_ID and Client_Secret to the EUA 510 through the NA 520. Since Client_ID and Client_Secret are generated in the same manner as in STEP 01 of FIG. 3, a description of the generation of Client_ID and Client_Secret will not be provided herein.

STEP 02 is a service/resource discovery step S620. For the client to initiate an authorization procedure, a procedure for providing a service requested by the client or discovering a resource owner having resource information is needed. The client acquires information (ID or URI) about the resource owner and determines the location of a resource server in which the resource is located by the service/resource discovery step. For this purpose, in one embodiment, the client acquires information about the location (ID or URI) of the resource owner and the location of the resource server resource through the NSCL 530 belong to the M2M service domain where the protected resource is located. For example, the service/resource discovery step S520 may include transmitting a discovery message including discovery filter criteria such as the type of desired information to the NA 520 by the EUA 510, transmitting a discovery message to the NCSL 530 having discovery resource by the NA 520, and searching for a Resource_URI list matching the discovery filter criterion using the discovery resource and transmitting a search result to the EUA 510 by the NSCL 530. In the service/resource discovery step S520, the D/G 550 that has collected or generated information stored in the resource or the NA 520 being the resource owner may indicate at least one of its URI and Resource_URI to the EUA 510 being the client. If the client has prior knowledge of the resource owner or Resource_URI or if the locations of the resource owner and the resource are preset, the above service/resource discovery step S620 may be omitted. That is, the client may acquire the Resource_URI information before an authorization request step S630. The Resource_URI information may be acquired in the service/resource discovery step S620 or received in advance from the resource owner according to a service provider's setting or policy or in any other procedure.

STEP 03 is the authorization request step S630. In the authorization request step S630, the EUA 510 requests an authorization to the NSCL 530. The NSCL 530 detects a resource owner corresponding to Resource_URI at an SCL or application resource level. As described before with reference to FIG. 3, the NSCL 530 may acquire, from an attribute of a container resource or a location container resource, information about a resource owner having protected resource which the client attempts to access. The NSCL 530 transmits an authorization request message to the NA 520 being a detected resource owner. Parameters that may be included in the authorization request message have been described in STEP 03 of FIG. 3 and thus will not be described herein.

STEP 04 is a client verification step S640. The NA 520 being the resource owner verifies the client in regard to the authorization request message. To verify the client, the resource owner may request client verification to the MAS 540, or the resource owner may request client verification to an M2M service provider (NSCL) and the M2M service provider may verify the client according to an access authorization policy of the M2M service provider. For example, the method for requesting verification of the EUA 510 to the MAS 540 may include requesting verification of the EUA 510 to the MAS 540 through the NSCL 530 by the NA 520 being the resource owner, determining whether the EUA 510 has been normally registered to the MAS 540 based on client credentials by the MAS 540, and transmitting a client verification response message to the NA 520 based on the determination result through the NSCL 530 by the MAS 540. The verification request message may include parameters such as the client credentials (Client_ID and Client_Secret) and the client verification response message may include the client credentials and certificates.

STEP 05 is an authorization grant step S650. Upon successful completion of the client authentication, the resource owner NA 520 requests the resource server D/G 550 to set up access right for the client EUA 510 so that the client EUA 510 can access to the protected resource. The D/G 550 generates an access right resource associated with the protected resource upon request of the NA 520. Alternatively, if the access right resource associated with the protected resource already exists, the D/G 550 updates the attribute of the access right resource. The access right resource is a resource in which information used to control access to the protected resource is stored, that is, information indicating an allowed entity and what the allowed entity is allowed to do with the protected resource. The NA 520 transmits an authorization grant message to the authorization server MAS 540 through the NSCL 530 to inform the MAS 540 that authorization for EUA 510 has been granted. Parameters that may be included in the authorization request message and the authorization grant message have been described in STEP 05 of FIG. 3 and thus will not be described herein.

STEP 06 is an authorization code issuance and access token request step S660, which is an optional step. The MAS 540 generates an authorization code and issues the authorization code to the EUA 510, as evidence that the authorization request of the EUA 510 has been accepted. The EUA 510 requests to issue an access token required to access to information contained in the protected resource to the MAS 540, with presenting the authorization code. Parameters that may be included in the access token request message have been described in STEP 06 of FIG. 3 and thus will not be described herein.

STEP 07 is an access token issuance step S670. The MAS 540 validates the authorization code presented by the EUA 510. If the authorization code is valid, the MAS 540 generates an access token, delivers the access token to the D/G 550 in which the resource is located so as to associate the access right resource with the access token, and issues the access token to the EUA 510, along with an allowed access scope. If STEP 06 is omitted, the MAS 540 generates the access token upon receiving the access authorization message from the resource owner in STEP 05, without checking the authorization code. The D/G 550 manages the received access token by mapping the access token to the access right resource. The MAS 540 may issue a refresh token along with the access token in order to update the access token. Parameters that may be included in a message carrying the access token have been described in STEP 07 of FIG. 3 and thus will not be described herein.

STEP 08 is an access step S680 to a protected resource. Based on the access token, the EUA 510 accesses the resource located in the NSCL 430 to query information. The NSCL 430 validates the access token received from EUA 510 by comparing with the access token received from the MAS 540, checks the access right resource, and allows the EUA 510 to access to the protected resource within the authorization scope matching the access token.

FIG. 7 is a flowchart of an operation for establishing an authorization to access resource, when a client has not subscribed to an M2M service and a resource owner is D/G according to an embodiment of the present disclosure.

In regard to a relationship between entities, the EUA 510 is independent of the M2M service provider domain, the EUA 510 is a client, and the D/G 550 is a resource owner.

STEP 01 (S710), STEP 02 (S720), STEP 06 (S760), STEP 07 (S770), and STEP 08 (S780) are performed in the same manner as their counterparts in FIG. 6. Accordingly, a description of the above steps is not provided herein and the following description focuses on STEP 03, STEP 04, and STEP 05.

STEP 03 is an authorization request step S730. In the authorization request step S730, the EUA 510 requests an authorization to the NSCL 530. The NCSL 530 detects a resource owner corresponding to Resource_URI at an SCL or application resource level. As described before with reference to FIG. 3, the NSCL 530 may acquire, from an attribute of a container resource or a location container resource, information about a resource owner having protected resource which the client attempts to access. The NSCL 530 transmits an authorization request message to the D/G 550 being a detected resource owner. Parameters that may be included in the authorization request message have been described in STEP 03 of FIG. 3 and thus will not be described herein.

STEP 04 is a client verification step S740. The D/G 550 verifies the client in regard to the authorization request message received from the NSCL 530. To verify the client, the resource owner may request client verification to the MAS 540, or the resource owner may request client verification to an M2M service provider (NSCL) and the M2M service provider may verify the client according to an access authorization policy of the M2M service provider. For example, the method for requesting verification of the EUA 510 to the MAS 540 may include requesting verification of the EUA 510 to the MAS 540 to which the EUA 510 has been registered through the NSCL 530 by the D/G 550, determining whether the EUA 510 has been normally registered to the MAS 540 based on client credentials by the MAS 540, and transmitting a client verification response message to the resource owner based on the determination result through the NSCL 530 by the MAS 540. The verification request message may include parameters such as the client credentials (Client_ID and Client_Secret) and the Client Verification Response message may include the client credentials and certificates.

STEP 05 is an authorization grant step S750. Upon successful completion of the client authentication, the resource owner D/G 550 generates an access right resource associated with the protected resource so that the EUA 510 may access to the protected resource. Alternatively, if the access right resource associated with the protected resource already exists, the D/G 550 updates the attribute of the access right resource. The access right resource is a resource in which information used to control access to the protected resource is stored, that is, information indicating an allowed entity and what the allowed entity is allowed to do with the protected resource. The D/G 550 transmits an authorization grant message to the authorization server MAS 540 through the NSCL 530 to inform the MAS 540 that authorization for EUA 510 has been granted. Parameters that may be included in the authorization request message have been described in STEP 03 of FIG. 3 and thus will not be described herein.

Figure 8:
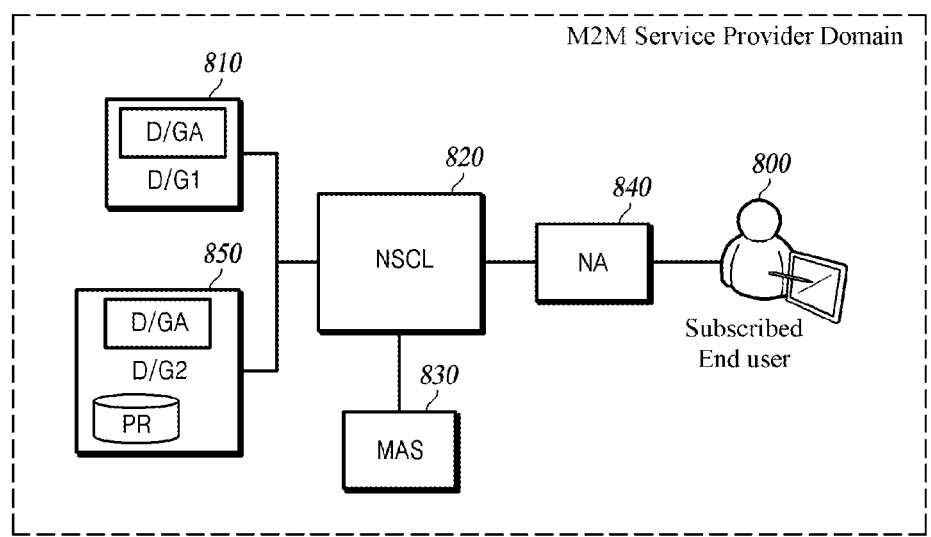
FIG. 8 is a schematic block diagram showing a relationship between M2M service entities, when a client and a resource owner belong to the same M2M service provider domain.
Figure 9:
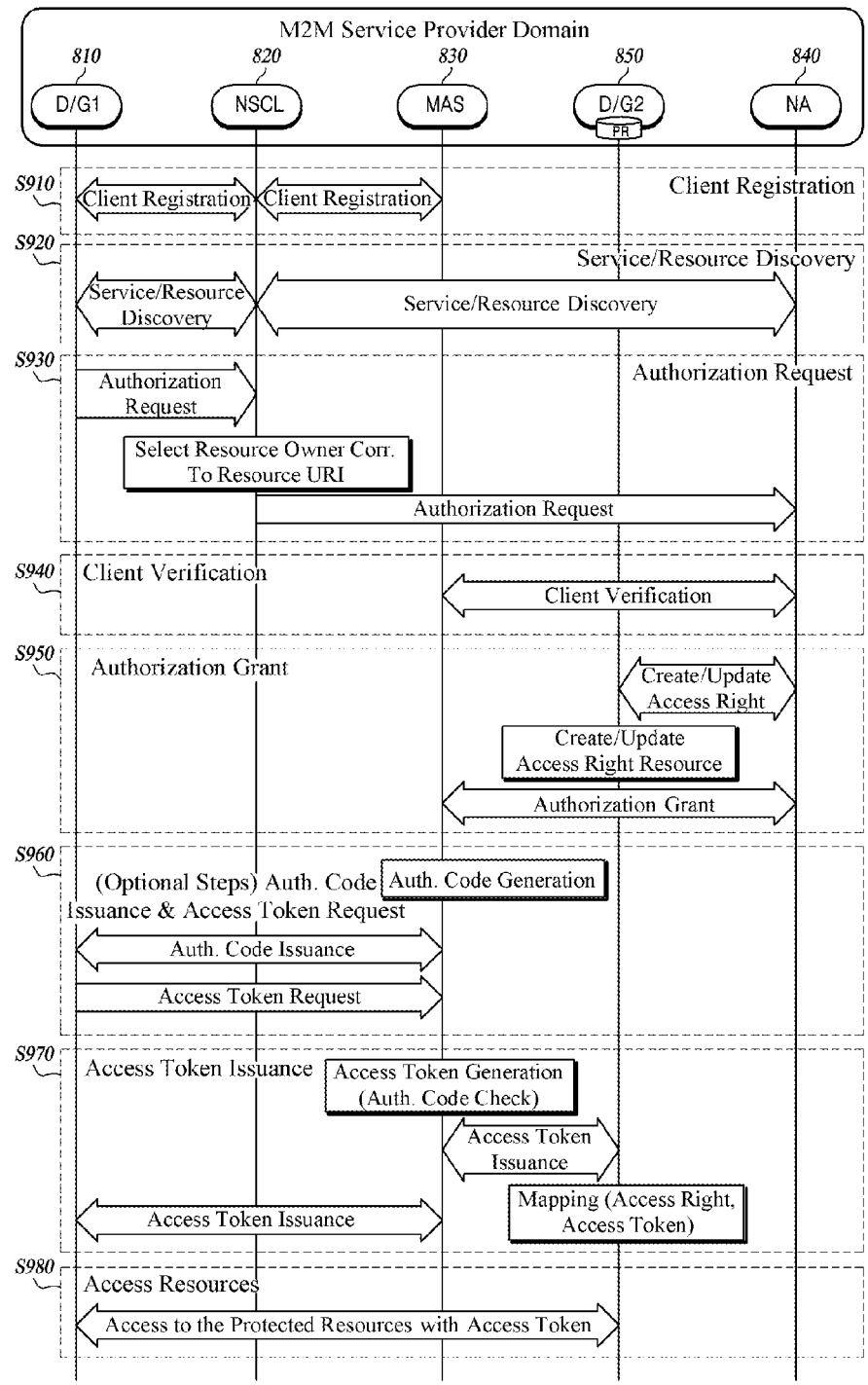
FIG. 9 is a flowchart of an operation for establishing an authorization to access resource, when a client and a resource owner belong to the same M2M service provider domain and the resource owner is an NA according to an embodiment of the present disclosure.
Figure 10:
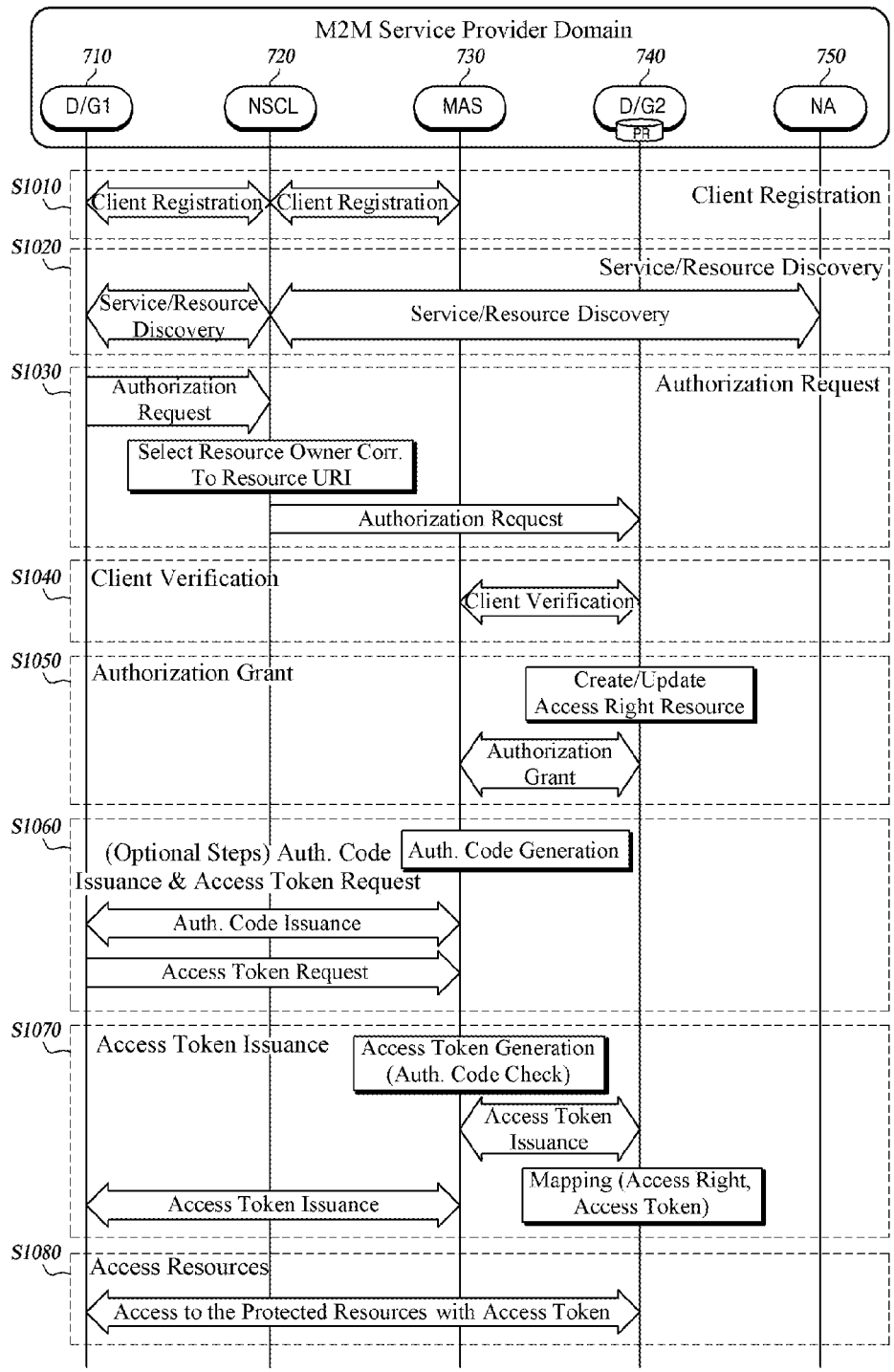
FIG. 10 is a flowchart of an operation for establishing an authorization to access resource, when a client and a resource owner belong to the same M2M service provider domain and the resource owner is D/G2 according to an embodiment of the present disclosure.

With reference to FIGS. 8, 9 and 10, a method for establishing an authorization to access resource when a client and a resource owner belong to the same M2M service provider domain will be described below.

FIG. 8 is a schematic block diagram showing a relationship between M2M service entities, when a client and a resource owner belong to the same M2M service provider domain.

FIG. 8 is based on the assumption that an end user 800 or a single D/G1 810 belonging and subscribing to the same M2M service provider domain attempts to access a resource which stores information generated or collected by another D/G 850.

There is a need for differentiating authorizations of end users subscribed to the same M2M service provider to access resource in which a D/G of the same M2M service provider stores generated or collected information. When a D/G attempts to access the resource in which another D/G in the same M2M service provider domain stores the generated or collected information, the D/G needs to obtain an authorization to access the resource.

FIG. 9 is a flowchart of an operation for establishing an authorization to access resource, when a client and a resource owner belong to the same M2M service provider domain and the resource owner is an NA according to an embodiment of the present disclosure.

In regard to a relationship between entities in FIG. 9, D/G1 810 and D/G2 850 are in the same M2M service provider domain. D/G1 810 is a client and an NA 840 is a resource owner. The resource that the client attempts to access is located in an SCL of D/G2 850.

While D/G1 810 is described as a client in FIG. 9 and the following description, it should be understood that the same authorization establishment mechanism is applicable when the client is an end user 800.

The procedure of FIG. 9 is similar to the procedure of FIG. 3 except that a client and a resource owner are located in the same M2M service provider domain.

Step 00 is pre-procedures conforming to the ETSI M2M standard. In the pre-procedures, the client completes an M2M service bootstrap procedure, an M2M service connection procedure, and an SCL registration procedure. In addition, the relationship between D/G1 800 and a D/GSCL may be based on the premise that D/G1 800 performs a procedure for registering a DA and GA1.

STEP 01 is a client registration step S910. D/G1 810 is allocated client credentials (Client_ID and Client_Secret) by performing a client registration procedure with an NSCL 820. Upon receipt of a client registration message from D/G1 810, the NSCL 820 transmits a client registration message to a MAS 830. Upon receipt of the client registration message, the MAS 830 generates Client_ID and Client_Secret for D/G1 810 and allocates Client_ID and Client_Secret to D/G1 810 through the NSCL 820. Client_ID and Client_Secret are generated in the same manner as in STEP 01 of FIG. 3 and thus a description of generation of Client_ID and Client_Secret will not be provided herein.

STEP 02 is a service/resource discovery step S920. For the client to initiate an authorization procedure, a procedure for providing a service requested by the client or discovering a resource owner having resource information is needed. The client acquires information (ID or URI) about the resource owner and determines the location of a resource server (D/GSCL) in which the resource is located by the service/resource discovery step. For this purpose, in one embodiment, the client acquires information about the location (ID or URI) of the resource owner and the location of a resource server (D/GSCL) resource through the NSCL 820 belong to the M2M service domain where the resource is located. For example, the service/resource discovery step S920 may include transmitting a discovery message including discovery filter criteria such as the type of desired information to the NSCL 820 by D/G1 810, and searching for a Resource_URI list matching the discovery filter criterion and transmitting a search result to D/G1 810 by the NSCL 820. In the service/resource discovery step S920, the NA 840 being the resource owner may indicate at least one of its URI and Resource_URI to D/G1 810 being the client. If the client has prior knowledge of the resource owner or Resource_URI or if the locations of the resource owner and the resource are preset, the above service/resource discovery step S920 may be omitted. In other words, the client may acquire the Resource_URI information before an authorization request step S930. The Resource_URI information may be acquired in the service/resource discovery step S920 or received in advance from the resource owner according to a service provider's setting or policy or in any other procedure.

STEP 03 is the authorization request step S930. In the authorization request step S930, the client requests an authorization to the resource owner. D/G1 810 transmits an authorization request message to the NSCL 820. The NCSL 820 determines a resource owner corresponding to Resource_URI at an SCL or application resource level. The NSCL 820 may acquire, from an attribute of a container resource or a location container resource, information about a resource owner having protected resource which the client attempts to access, as described before with reference to FIG. 3. The NSCL 820 transmits an authorization request message to the NA 840 being a detected resource owner. Parameters that may be included in the authorization request message may be identical to those described in STEP 03 of FIG. 3 and thus will not be described herein.

STEP 04 is a client verification step S940. The resource owner verifies the client in regard to the authorization request message. To verify the client, the resource owner may request client verification to the MAS 830, an end user connected to the resource owner may verify the client, or the resource owner may request client verification to an M2M service provider (the NSCL/NA 820/840) and the M2M service provider may verify the client according to an access authorization policy of the M2M service provider. For example, the method for requesting client verification to the MAS 830 may include requesting by the resource owner, NA 840 for a verification of the client to the MAS 830 to which D/G1 810 has been registered, performing the verification by the MAS 830 determining whether D/G1 810 has been rightfully registered to MAS 830 based on client credentials, and transmitting a client verification response message to the NA 840 based on the performed result of the verification. The verification request message may include parameters such as the client credentials (Client_ID and Client_Secret), and the client verification response message may include the client credentials and certificates.

STEP 05 is an authorization grant step S950. Upon successful completion of the client authentication, the resource owner NA 840 requests the resource server D/G2 850 to set up an access right for the D/G1 810 to the relevant resource. D/G2 850 generates an access right resource associated with the protected resource upon request of the NA 840. Alternatively, if the access right resource associated with the protected resource already exists, D/G2 850 updates the attribute of the access right resource. The attribute of the access right resource may include an expiration time, and D/G2 850 may set an expiration time in the authorization of D/G1 810. The NA 840 transmits an authorization grant message through the NSCL 820 to the authorization server MAS 830 to inform the MAS 830 that authorization for D/G1 810 has been granted. Parameters and information that may be included in the authorization request message and the authorization grant message may be identical to those described in STEP 03 of FIG. 3 and thus will not be described herein.

STEP 06 is an authorization code issuance and access token request step S960, which is an optional step. The MAS 830 generates an authorization code and issues the authorization code to D/G1 810, as evidence that the authorization request of D/G1 810 has been granted. D/G1 810 requests to issue an access token required to access to the protected resource information to the MAS 830 using the authorization code. Parameters that may be included in an access token request message may be identical to those described in STEP 06 of FIG. 3 and thus will not be described herein.

STEP 07 is an access token issuance step S970. The MAS 830 validates the authorization code presented by D/G1 810. If the authorization code is valid, The MAS 830 generates an access token and delivers the access token to D/G2 850 in which the resource is located so as to associate the access right resource with the access token, and issues the access token to D/G1 810, along with an allowed access scope. If STEP 06 is omitted, the MAS 830 generates the access token upon receiving the access authorization message from the resource owner in STEP 05, without checking the authorization code. D/G1 810 manages the received access token by mapping the access token to the access right resource. The MAS 830 may issue a refresh token along with the access token in order to update the access token. Parameters that may be included in the access token request message may be identical to those described in STEP 07 of FIG. 3 and thus will not be described herein.

STEP 08 is an access step S980 to a protected resource. Based on the access token, D/G1 810 accesses the resource located in D/G2 850 to query information. D/G2 850 validates the access token received from D/G1 810 by comparing with the access token received from the MAS 830, checks the access right resource, and allows D/G1 810 to access to the protected resource within an authorization scope matching the access token.

FIG. 10 is a flowchart of an operation for establishing an authorization to access resource, when a client and a resource owner belong to the same M2M service provider domain and the resource owner is D/G2 according to an embodiment of the present disclosure.

In regard to a relationship between entities in FIG. 10, D/G1 810 and D/G2 850 are in the same M2M service provider domain. D/G1 810 is a client and D/G2 850 is a resource owner. Resource that the client attempts to access is located in the SCL of D/G2 850. The procedure of FIG. 10 is similar to the procedure of FIG. 4 except that a client and a resource owner are in the same M2M service provider domain.

While D/G1 810 is described in FIG. 10 as a client, it should be understood that the same authorization establishment mechanism is applicable when the client is the end user 800.

STEP 01 (S1010), STEP 02 (S1020), STEP 06 (S1060), STEP 07 (S1070), and STEP 08 (S1080) are performed in the same manner as their counterparts in FIG. 9. Accordingly, a description of the above steps is not provided herein and the following description focuses on STEP 03, STEP 04, and STEP 05.

STEP 03 is the authorization request step S1030. In the authorization request step S1030, the client requests an authorization to the resource owner. D/G1 810 transmits an authorization request message to the NSCL 820. The NCSL 820 determines a resource owner corresponding to Resource_URI at an SCL or application resource level. As described before with reference to FIG. 3, the NSCL 820 may acquire, from an attribute of a container resource or a location container resource, information about a resource owner having protected resource which the client attempts to access. The NSCL 820 transmits an authorization request message to D/G2 850 being a detected resource owner. Parameters that may be included in the authorization request message may be identical to those described in STEP 03 of FIG. 3 and thus will not be described herein.

STEP 04 is a client verification step S1040. D/G2 850 verifies the client in regard to the authorization request message received from the NSCL 820. To verify the client, the resource owner may request client verification to the MAS 830, or the resource owner may request client verification to an M2M service provider (NSCL/NA) and the M2M service provider may verify the client according to an access authorization policy of the M2M service provider. For example, the method for requesting verification of D/G1 810 to the MAS 830 may include requesting verification of D/G1 810 to the MAS 830 by D/G2 850, determining whether D/G1 810 has been normally registered to the MAS 830 based on client credentials by MAS 830, and transmitting a client verification response message to D/G2 850 based on the determination result through the NSCL 820 by the MAS 830. A verification request message may include parameters such as client credentials (Client_ID and Client_Secret) and a client verification response message may include the client credentials and certificates.

STEP 05 is an authorization grant step S1050. Upon successful completion of the client authentication, the resource owner D/G2 850 generates an access right resource associated with the protected resource so that D/G1 810 may access the protected resource. Alternatively, if the access right resource associated with the protected resource already exists, D/G2 850 updates the attribute of the access right resource. The access right resource is a resource in which information used to control access to the protected resource is stored, that is, information indicating an entity allowed to access the protected resource and what the allowed entity is allowed to do with the protected resource. D/G2 850 transmits an authorization grant message to the authorization server MAS 830 through the NSCL 820 to inform the MAS 830 that authorization for D/G1 810 has been granted. Parameters and information that may be included in an authorization request message and an authorization grant message may be identical to those described in STEP 05 of FIG. 4 and thus will not be described herein.

Although the steps of each of FIGS. 3, 4, 5, 6, 7, 9 and 10 have been described as being sequentially performed, this is only an exemplary description of the technical idea of at least one embodiment of the present disclosure. Those skilled in the art will appreciate that various modifications, additions and substitutions are possible, without departing from the characteristics of at least one embodiment of the disclosure. For example, the order of steps shown in each of FIGS. 3, 4, 5, 6, 7, 9 and 10 may be changed, or one or more of the steps may be performed in parallel. Therefore, the present disclosure is not limited to the time-series order as shown in FIGS. 3, 4, 5, 6, 7, 9 and 10.

Although exemplary embodiments of the present disclosure have been described for illustrative purposes, those skilled in the art will appreciate that various modifications, additions and substitutions are possible, without departing from the essential characteristics of the disclosure. Therefore, exemplary embodiments of the present disclosure have been described for the sake of brevity and clarity. Accordingly, one of ordinary skill would understand the scope of the disclosure is not limited by the explicitly described above embodiments but by the claims and equivalents thereof.

CROSS-REFERENCE TO RELATED APPLICATION

If applicable, this application claims priority under 35 U.S.C §119(a) of Patent Application No. 10-2012-0057167, filed on May 30, 2012 in Korea, the entire content of which is incorporated herein by reference. In addition, this non-provisional application claims priority in countries, other than the U.S., with the same reason based on the Korean patent application, the entire content of which is hereby incorporated by reference.

The invention claimed is:

1. A method for establishing an authorization to access resource in Machine-to-Machine (M2M) communication, when an entity selected from a terminal, a gateway and an end user as a client in an M2M service provider domain attempts to access resource located in a terminal or a gateway in the same M2M service provider domain, the method comprising:
  receiving by the client a client credential allocated from an authentication server for providing an authentication service in the M2M service provider domain by performing a client registration to a service layer of an M2M server for providing an M2M service which is required in the M2M service provider domain;
  requesting an authorization to access the resource to a resource owner of the resource through the service layer based on information about a Universal Resource Identifier (URI) of the resource by the client;
  verifying by the resource owner the client through the authentication server;
  granting the authorization for the client to access the resource by the resource owner;
  issuing an access token to the client by the authentication server in the M2M service provider domain, and
  accessing by, a processor of the client, the resource based on the issued access token.

2. The method of claim 1, further comprising acquiring the information about the URI of the resource through one of the service layer and the resource owner by the client.

3. The method of claim 1, further comprising:
  issuing an authorization code to the client by the authentication server; and
  requesting an access token to the authentication server using the issued authorization code by the client.

4. The method of claim 1, wherein the authorization comprises:
  requesting generation or update of an access right source associated with the resource to an entity in which the resource is located; and
  notifying the authentication server that the client has been authorized.

5. The method of claim 1, wherein a lifetime is set for the access token.

* * * * *